United States Patent [19]
Fay

[11] 3,820,637
[45] June 28, 1974

[54] DRUM BRAKE SHOE ACTUATOR

[76] Inventor: Clarence C. Fay, 17211 Edgewater Dr., Lakewood, Ohio 44107

[22] Filed: Mar. 22, 1973

[21] Appl. No.: 343,809

[52] U.S. Cl. .............. 188/106 P, 60/581, 92/75, 188/345, 188/364
[51] Int. Cl. ............................................ F16d 65/14
[58] Field of Search ........ 188/106 P, 345, 363, 364; 92/75; 60/581; 192/85 AT

[56] References Cited
UNITED STATES PATENTS

| | | | |
|---|---|---|---|
| 2,326,116 | 8/1943 | Baldwin | 92/75 X |
| 2,918,148 | 12/1959 | Uhlenhaut et al. | 188/345 |
| 3,336,597 | 8/1967 | Fay | 188/345 X |
| 3,559,770 | 2/1971 | Bricker et al. | 188/364 |
| 3,596,741 | 8/1971 | Miyajima | 188/345 |

*Primary Examiner*—George E. A. Halvosa
*Attorney, Agent, or Firm*—McNenny, Farrington, Pearne & Gordon

[57] ABSTRACT

There is provided in a dual hydraulic subsystem drum and brake shoe braking apparatus a dual subsystem hydraulic actuator having piston/cylinder assemblies communicating with separate hydraulic subsystems, and force-sensing and distributing means coacting between the pistons and centrally located abutments on confronting brake shoe ends. This apparatus is particularly useful in combination with a dual hydraulic master cylinder actuator wherein the pistons are in side-by-side relation instead of tandem relation, joined together by a "wobble bar" and driven by application of pressure from a foot pedal to a point on the wobble bar between the two pistons.

3 Claims, 7 Drawing Figures

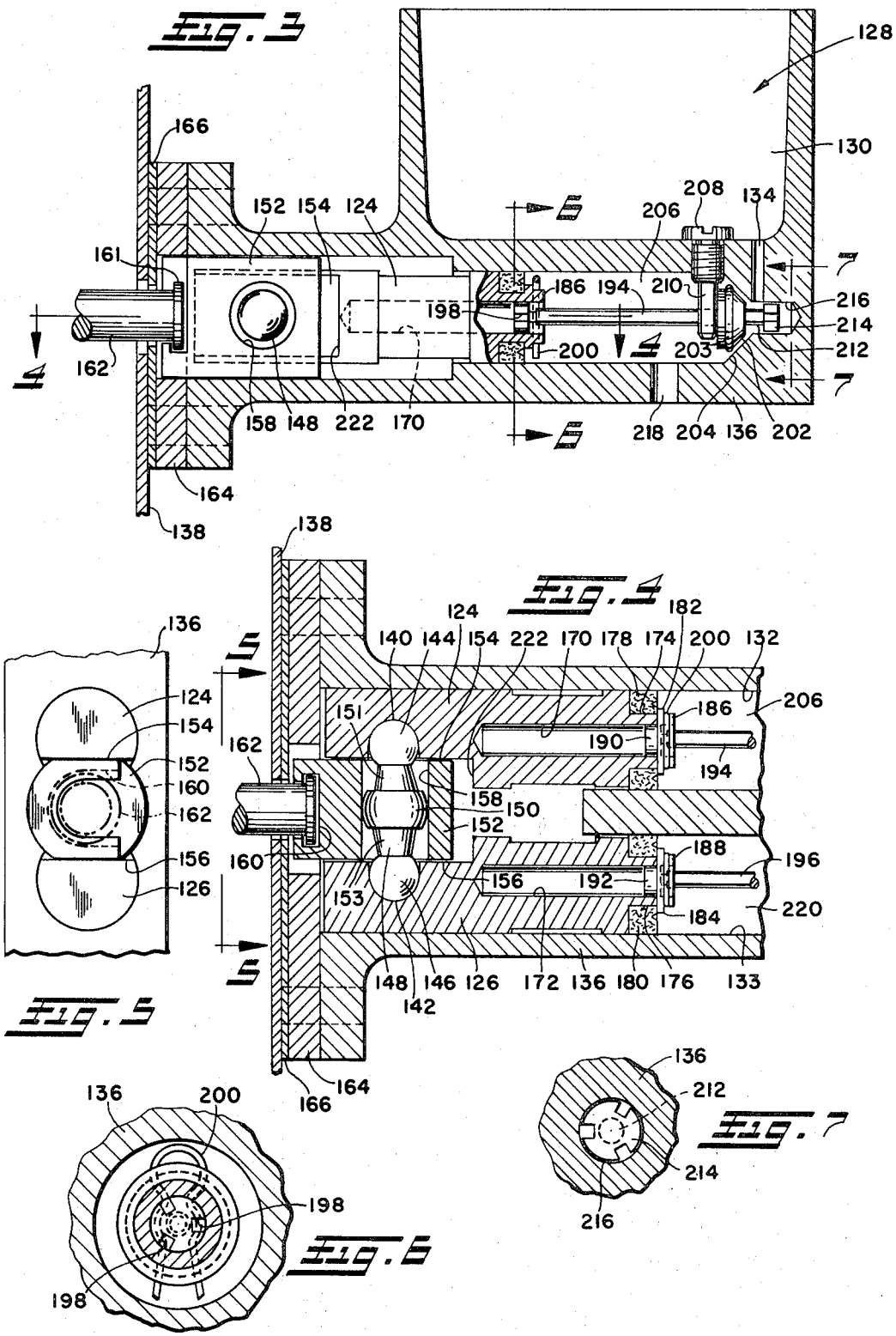

DRUM BRAKE SHOE ACTUATOR

BACKGROUND OF THE INVENTION AND PRIOR ART

Safety standards for automotive vehicles, especially as they relate to brake systems, have now evolved to the dual hydraulic system which ensures that in the event of failure of one of the hydraulic subsystems, the vehicle is not without brakes. A number of arrangements utilizing two isolated hydraulic subsystems has been proposed including (a) one subsystem operating only the front brakes and the other only the rear brakes (2 + 2); (b) one subsystem operating left front and right rear brakes and the other, right front and left rear (2 × 2); (c) one subsystem operating all four brakes and the other the front brakes only (4 + 2); (d) one subsystem operating both front brakes and the left rear and the other operating both front brakes and the right rear (3 + 3); and (e) each subsystem operating all four brakes (4 + 4). Where a given brake is common to both subsystems as in (c), (d), and (e), it has been the practice to operate such common brakes as a "half brake" utilizing full-floating, two-leading type drum brake assemblies.

The present invention provides an improved automotive brake system which is useful in the (c), (d), and (e) type systems.

The systems of the present invention are most effective in the 4 + 4 type of automotive brake system and are characterized by a master hydraulic actuator which in combination with the improved wheel cylinders hereof gives outstanding results. So far as I am now aware no system currently under consideration is capable of achieving two critical objectives and at the same time not only meeting current government safety specifications as to stopping distance after failure of one subsystem, but in actual test better than halving the allowed stopping distance. The critical objectives are (a) reduced pedal dive or pedal drop as one subsystem fails, and (b) increased pressure applied to the hydraulic fluid in the remaining subsystem after failure of the other.

Pedal dive or pedal drop upon failure of one subsystem is characteristic of the tandem-type dual master cylinder actuator and may be as great as 2.2 inches pedal movement before the remaining subsystem is engaged and actuated. (See paper No. 680017, SAE Automotive Engineering Congress, Detroit, Michigan, Jan. 8 – 12, 1968, "Legislative Effect on Brake Design," E. G. Vallin.) In the device I use to actuate the wheel cylinders of the present invention the pedal dive can be limited to as little as 0.3 inch which is negligible in its effect on the drive compared with 1.5 to 2.2 in. normally encountered. In fact, 0.3 in. may be so little as to be unnoticeable to the driver; and it is desired that there be some pedal dive, e.g., up to 0.50 inch, to inform the driver that something is wrong in the brake system, but without being so much as to cause panic, or to extend the point of pick-up of the remaining subsystem beyond the driver's reach, or to cause the back of the foot pedal to encounter an obstruction on the floor, e.g., a carpet or floor mat, before the point of pick-up of the remaining subsystems is reached.

Still further, the dual master hydraulic actuator of the type described in my U.S. Pat. No. 3,336,597 dated Aug. 15, 1967, U.S. Pat. No. 3,370,426 dated Feb. 27, 1968, U.S. Pat. No. 3,406,522 dated Oct. 22, 1968, and U.S. Pat. No. 3,530,670 dated Sept. 29, 1970, in combination with the dual wheel cylinder assemblies, has the ability to show a substantial increase in the fluid pressure of the remaining subsystem upon failure of one subsystem. The result of this ability in combination with the improved wheel cylinders of the present invention is what allows better than halving the allowed stopping distance as currently specified by the proposed government specification FMVSS No. 70-27. For example, the requirement for emergency stopping from 60 mph is 431'. I have achieved stopping distances of 192 feet and 195 feet in my 1970 Chrysler Newport equipped with my improved braking system. The increase in pressure available in the remaining subsystem may be as much as twice that available in that subsystem when both subsystems were operative, without additional force applied by the driver. This automatically compensates at least in a major part for the loss of one-half of the braking system due to failure and allows performance of the brakes of substantially the same degree as before failure of a subsystem in a 4 + 4 installation.

BRIEF STATEMENT OF THE INVENTION

Briefly stated, the present invention is in a dual hydraulic subsystem braking apparatus which is characterized by force-sensing and distributing means coacting between the outer faces of parallel acting brake actuator pistons and centrally located unitary force-receiving abutments on confronting brake shoe members for receiving the off-center thrusts of at least one pair of the oppositely acting pistons and transmitting those thrusts to each of the centrally located abutments, respectively, of the confronting brake shoes. In general, the braking apparatus in which the structures of the present invention are particularly useful include a support member, a rotatable drum mounted for rotation relative to the support member, a pair of oppositely movable brake shoes carried by the support member and mounted for selective braking coaction between the support member and the drum. Each of the shoes is provided with a centrally located force-receiving abutment. A dual subsystem hydraulic brake actuator apparatus is mounted on the support and disposed between the confronting ends of the brake shoes. This hydraulic actuator includes a pair of parallel axised piston/cylinder assemblies each including a cylinder and a pair of oppositely acting pistons defining a variable volume hydraulic fluid chamber between their respective inner faces, each such chamber being hydraulically connected to one of the two isolated hydraulic subsystems, for example in an automotive vehicle. Force-sensing and distributing means are provided which coact between the outer faces of parallel acting pistons and each of the centrally located abutments, respectively, of the confronting brake shoes for receiving the off-center thrusts of at least one pair of the oppositely acting pistons and transmitting those thrusts to each said centrally located abutment, respectively, of the confronting brake shoes. When installed in an automotive vehicle, for example, and particularly in combination with a master cylinder of the type shown and described in my aforesaid U.S. Pat. No. 3,406,522, there is obtained a braking system for such vehicle wherein the separate hydraulic subsystems are so arranged and operated that one is fully redundant with respect to the other. Thus, if there is failure in one hydraulic subsystem, the effect is barely noticeable to the driver and, if the driver fails to detect a small amount of "pedal dive," the only other means by which he would be aware of the failure of one of the subsystems would be through warning lights. No increase of foot pressure on the brake pedal is required when one subsystem fails, yet there is no detectable change in braking ability.

BRIEF DESCRIPTION OF THE DRAWINGS

FIG. 3 is a cross-sectional view of a master cylinder actuator for the dual hydraulic brake system of this invention.

FIG. 4 is a fragmentary cross-sectional view of the master hydraulic actuator shown in FIG. 3 as it appears in the plane indicated by the line 4—4 in FIG. 3.

FIG. 5 is a fragmentary end view of a master hydraulic actuator as it would appear in the plane 5—5 of FIG. 4 with the mounting wall and brake pedal pitman removed.

FIG. 6 is a fragmentary cross-sectional view of one means of frictionally retaining an actuator valve stem as it appears in the plane indicated by the line 6—6 in FIG. 3.

FIG. 7 is a fragmentary cross-sectional view of a pilot piston for supporting the actuator valve stem at its distal extremity as it appears in the plane indicated by the line 7—7 in FIG. 3.

DETAILED DESCRIPTION OF THE DRAWINGS

Figure 1:
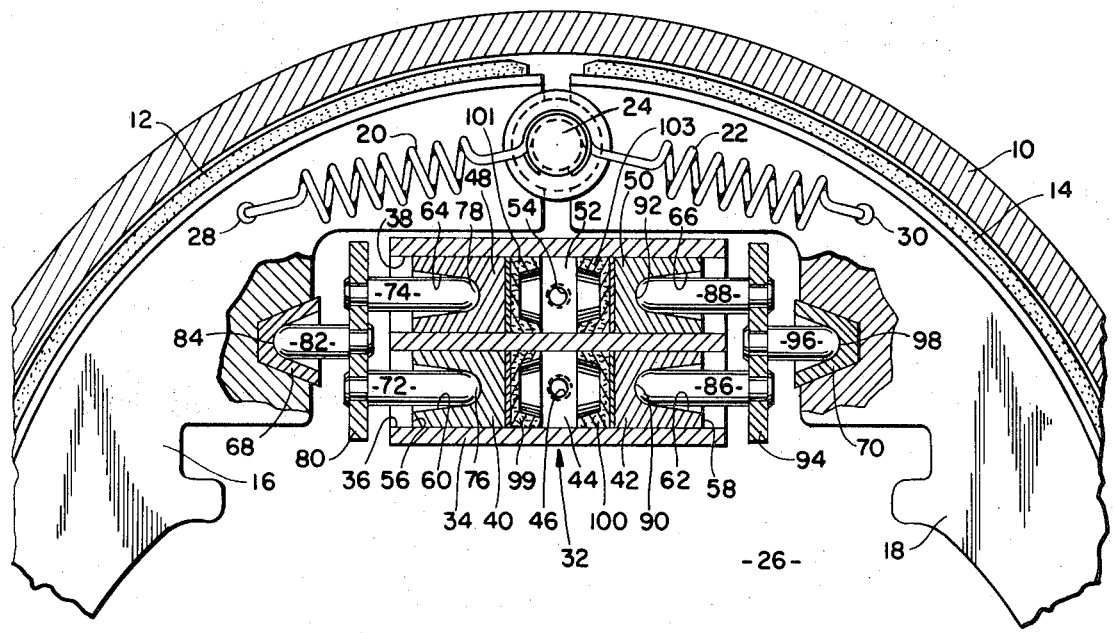
FIG. 1 is a fragmentary view of a brake drum and brake shoes showing wheel cylinders useful in the present invention and disposed for operative coaction between the ends of the brake shoes to move the latter into and out of braking engagement with the brake drum.

Referring now more particularly to FIG. 1, there is here shown a fragmentary cross-sectional view of a brake drum and brake shoes showing the wheel cylinders or hydraulic brake actuators of the present invention disposed for operative coaction between the ends of the brake shoes to move the latter into and out of engagement with the brake drum. Thus, there is provided in accordance with FIG. 1 a rotating member 10 in the form of a brake drum. Such a brake drum may be of conventional construction and mounted in a conventional manner as, for example, in a passenger car vehicle. Mounted for braking coaction with the brake drum 10 are brake shoes 12 and 14 having conventional web members 16 and 18, respectively, being centrally located and extending radially inwardly from the brake shoes 12 and 14. To release the brake shoes 12 and 14 from braking contact with the drum 10, there are provided brake release springs 20 and 22 coacting between the brake shoes 12 and 14, respectively, and a brake release spring pin 24 which is in turn mounted on a stationary support member or spider 26. The support member 26 is a conventional spider for a brake drum system and is secured to the axle housing (not shown) in a conventional manner. Brake release springs 20 and 22 are attached at their opposite ends to the webs 16 and 18, respectively, through holes 28 and 30 into which the free ends of the springs 20 and 22 are hooked in a known manner. Thus, the brake release springs 20 and 22 are adapted to return the brake shoes to their normal open position after application.

The stationary brake spider 26 has secured adjacent its outer periphery wheel cylinders assembly 32. The wheel cylinders assembly 32 comprises a pair of parallel axised piston/cylinder assemblies and is composed of a housing 34 which may be suitably secured to the spider 26 as by bolting, or it may be integrally cast therewith. Depending upon the type of drum brakes, there may be one, or two, opposed wheel cylinders assemblies 32. In the full-floating, two-leading type drum brakes, there are two wheel cylinders assemblies 32 diametrically opposed to each other and coacting with the confronting extremities of brake shoes 12 and 14, respectively.

The housing 34 is provided with a pair of parallel cylindrical bores 36 and 38. Cylindrical bore 36 is provided with a pair of oppositely acting pistons 40 and 42 slidably mounted therein and defining between them a variable volume hydraulic fluid chamber 44 having a port 46 communicating therewith through which hydraulic fluid flows into or out of the variable volume chamber 44. In like manner, cylinder 38 is provided with oppositely acting pistons 48 and 50, the inner ends of which define between them a variable volume chamber 52 having a hydraulic fluid port 44 communicating therewith. Hydraulic fluid ports 46 and 54 extend through the housing 34.

The outer faces 56 and 58 of oppositely acting pistons 40 and 42 are provided with sockets 60 and 62. In like manner, the pistons 48 and 50 are provided with sockets 64 and 66, respectively. It should be noted that in the preferred embodiment, the depth of the sockets 60, 62, 64, and 66 exceeds one-half the axial length of the pistons 40, 42, 48, and 50, respectively. This configuration avoids a problem of "chattering."

As shown in FIG. 1, centrally located webs 16 and 18 are provided, respectively, with individual socket members 68 and 70 suitably secured thereto.

Coacting between the confronting ends of the brake shoes 12 and 14 are force-sensing and distributing means. In the preferred embodiment as illustrated in FIG. 1, these means include a pair of parallel rod members 72 and 74 having hemispherically shaped inner ends 76 and 78, respectively. The inner ends 76 and 78 are configured for mating coaction with the bottoms of the sockets 60 and 64, respectively, in the out faces of parallel acting pistons 40 and 48, respectively. The rod members 72 and 74 are secured by any suitable means to a cross head or yoke member 80. Lying on an axis parallel to and equidistant from the axes of rods 72 and 74 is an oppositely extending rod 82 having also desirably a hemispherical extremity 84 for coaction with the bottom of the socket 68. Thus, when hydraulic fluid is introduced through the ports 46 and 54, the pistons 40 and 48 are driven to the left as shown in FIG. 1. The pressure on the fluid within the variable volume chambers 44 and 52 is transmitted through the piston bodies 40 and 48 to the rods 72 and 74 and thence to the cross head 80 and distributed thereby as a single thrust to the oppositely extending single rod 82 (with respect to which the thrusts of pistons 40 and 48 are "off-center"), the socket 68 and in turn to the centrally located web member 16 to operate the brake shoe 12.

In like manner, force-receiving and distributing means coact between the opposite parallel acting pistons 50 and 42 and the brake shoe 14. Thus, there are provided parallel rod members 86 and 88 having also hemispherically shaped inner extremities 90 and 92, serving as bearing surfaces, respectively, and having the outer extremities secured to a header bar or yoke 94. Mounted on an axis parallel to the axes of rods 86 and 88 and equidistant therefrom, there is provided an oppositely extending rod 96 also having a hemispherically shaped outer extremity 98 for coaction with the base of the sockets 70. With respect to rod member 96, the thrusts sensed by rods 86 and 88 are "off-center." Simultaneously with the movement of the pistons 40 and 48 to the left, the pistons 42 and 50 move to the right. The force is sensed by the sensing means above described and distributed to the individual socket 70 as a single thrust and in turn to the brake shoes 14 in the manner above described. When manually applied pressure to the brake pedal is removed, the brake release springs 20 and 22 operate to apply a force to the force-receiving and distributing means as above described, forcing hydraulic fluid out of the variable volume chambers 44 and 52, thus releasing the brakes for subsequent operation.

It should be noted that in the preferred cases the sockets are provided with diverging walls toward the outer faces of the pistons such as the outer faces 56 and 58. In like manner, the sockets 68 and 70 are also provided with diverging wall surfaces. Such configuration ensures self-alignment even though one of the hydraulic subsystems should be inoperative.

The inner surfaces of the pistons 40, 42, 48, and 50 are conveniently provided with flexible cups 99, 100, 101, and 103, respectively, and cooperate with each other and the sidewalls of the bores 36 and 38 to define the variable volume chambers 44 and 52, respectively. The cups 99, 100, 101, and 103 are formed of conventional materials such as neoprene rubber which is resistant to hydraulic fluid. The fluid inlet ports 46 and 54 communicate with the variable volume chambers 44 and 52, respectively, through the housing 34 to accommodate the flow of hydraulic fluid under pressure either into or away from the variable volume chambers 44 and 52 in response to fluid pressure applied by the master hydraulic actuator 63 (FIG. 2) or in response to the force or bias of return springs 20 and 22, as the case may be.

Figure 2:
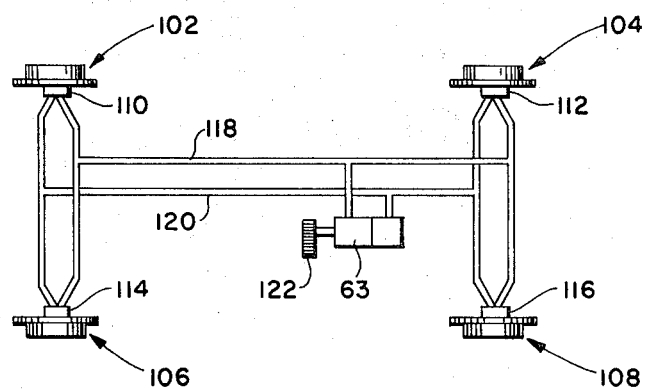
FIG. 2 is a diagrammatic and schematic layout of a fully redundant dual hydraulic brake system for an automotive vehicle.

Referring now more particularly to FIG. 2, there is here shown a dual hydraulic system of the type (*e*) above referred to as 4 + 4. This is also known as a fully redundant system. There are thus diagrammatically and schematically shown wheel stations 102, 104, 106, and 108 having wheel cylinders 110, 112, 114, and 116, respectively, associated therewith. A dual master hydraulic actuator 63 is provided. By means of separate isolated hydraulic subsystems including fluid supply lines 118 and 120, respectively, each leading to both front wheels and to both rear wheels, the master hydraulic cylinder 63 is connected to each of the wheels. As indicated above, these hydraulic subsystems are isolated from each other throughout their entire course and each is actuated from a single pedal pressure-applying device such as foot pedal 122.

Referring now more particularly to FIGS. 3, 4, and 5, there is here shown a master hydraulic actuator assembly useful in the brake systems of the present invention and comprising a pair of adjacently disposed master pistons 124 and 126 having their axes parallel to each other. The master pistons 124 and 126 may have the same or different diameters. A fluid reservoir assembly generally indicated at 128 is comprised of compartmented, isolated sections, one of which is shown in cross section in FIG. 3, for supplying hydraulic fluid to the separate hydraulic subsystems. Thus, a reservoir 130 is located and adapted for communication with the subsystem which is pressurized by the slidable piston 124 and communicates with its master cylinder bore 132 through a passageway 134. Master cylinder pistons 124 and 126 are desirably confined in a single housing 136 which is conveniently a cast body. A suitable cap (not shown) for the reservoir assembly 128 is provided. The master hydraulic actuator assembly is secured to the firewall 138 by any suitable means, e.g., bolts (not shown). If a booster or power assist apparatus is incorporated in the brake system, it is interposed between the master cylinder housing 136 and the firewall 138.

The proximal ends of pistons 124 and 126 are provided with sockets 140 and 142, respectively, to receive the ball-shaped extremities 144 and 146 of a wobble bar 148. Wobble bar 148 is provided with a centrally located fulcrum 150. In order to drive the pistons 124 and 126, there is provided an actuator 152 disposed between flats 154 and 156 milled into the confronting faces of pistons 124 and 126, and into which sockets 140 and 142 are recessed. The actuator 152 is provided with a transverse bore 158 of suitable diameter to accept the fulcrum 150 which has a diameter larger than the shaft portions 151 and 153 which terminate respectively in ball-shaped extremities 144 and 146. The actuator 152 projects beyond the end of the housing 136 and is provided with a slot 160 which is adapted to receive the end of a pitman bar 162 which is in turn connected to conventional foot pedal-operated means (not shown). Due to the extension of the actuator 152 beyond the end of the casting of the housing 136, there is conveniently provided a shim 164 between the body of the casting and the firewall. A gasket 166 may be provided if desired.

Usually, the master hydraulic actuator piston assembly is driven from a single pedally operated foot pedal conventionally mounted within the cab of the automotive vehicle, not shown, connected to the master piston actuator 152 by sliding into recess 160 and being fitted with an enlarged head 161 (FIG. 4) for limiting axial movement of the pitman bar relative to the master piston assembly and also as a pull-back coupling to return the pistons to neutral position under the influence of the pedal return spring. This structure makes possible easy removal and replacement of the master pistons 124 and 126 by removing the bolts securing the housing to the firewall 138 and slidably disconnecting the coupling or head 161 of the pitman 162 from the actuator 152.

As disclosed in my prior U.S. Pat. No. 3,406,522, each of the pistons 124 and 126 is provided with an internal bore 170 and 172, respectively. The head portions of the pistons 124 and 126 are suitably machined to provide a shoulder 174 and 176, respectively, adapted to receive and retain a suitable piston packing member or sealing member 178 and 180, respectively. In combination with the cylinder bores 132 and 133, the sealing members 178 and 180 provide a fluid-tight seal with the cylinder walls. The sealing members 178 and 180 are of suitable material to be forced over the flanges 182 and 184, respectively, and retained thereby on the heads of the pistons 124 and 126, respectively.

Each of the pistons 124 and 126 is provided with a cylindrical portion 186 and 188 of smaller diameter protruding beyond the flanges 182 and 184. The cylindrical portions 186 and 188 serve as convenient locations for retaining means for the distal extremities of valve stems 194 and 196. The distal extremities of valve stems 194 and 196 are provided with enlarged slotted heads 190 and 192 which are slidable in the piston bores 170 and 172. A milled slot or slots 198 in each of the head portions 190 and 192 permit flow of fluid into and out of the closed end bores 170 and 172. As best shown in FIG. 6, the retaining means is desirably in the shape of a hairpin retainer 200 which conveniently snaps into place to prevent separation of the valve stem 194 from the piston bore 170. The retainer also provides a positive initial drive for seating the valve 202 (FIG. 3) against the valve seat 204 on the forward stroke of the piston 124. An O-ring 203 coacts with piston bore 206 to effect a seal.

In order to bleed air from the fluid chamber 206, there is conveniently provided a slotted screw 208 which may be backed off a short distance with a screw driver to permit the escape of air from the chamber 206. The lower end of the screw 208 is provided with a retainer 210 which is adapted to be located behind the valve 202 to limit the rearward movement thereof upon the return stroke of the piston 124. Sufficient movement of the valve away from the seat 204 is permitted to allow movement of hydraulic fluid into or out of the chamber 206 as may be required. The forward end of the valve stem 194 is provided with a projecting portion 212 which is terminated with an enlarged head 214 slidable in closed end bore 216 for guiding the valve and valve stem assembly.

When the piston 124 is moved in a forward direction by the application of an axial force on the pitman bar 162 operating through the actuator 152 and the wobble bar 148, valve 202 is urged into seated relation against the valve seat 204, and hydraulic pressure is built up within the chamber 206. Pressurized fluid then flows into one of the isolated subsystem lines 118 (FIG. 2), for example, which is threadably secured to the port 218. In like manner, the other hydraulic fluid chamber 220 is provided with an opening (not shown) and it in turn is connected by suitable fitting means to the separate line 120 (FIG. 2).

The master hydraulic actuator illustrated in FIGS. 5 – 7, inclusive, is characterized by mechanical means for differentially driving the pistons 124 and 126 in response to the resistance against which the pistons move, and it operates in virtually the same manner as the master hydraulic actuator shown and described in my aforesaid U.S. Pat. No. 3,336,597. At the time of failure of one of the hydraulic subsystems, take-over means are provided which operate as described in U.S. Pat. No. 3,336,597. Thus, for example, if there is a failure in the subsystem of which piston 126 is the pressurizing element, there will be little or no resistance to the movement of piston 126, and the actuator 152 will be permitted to slide over the flat 154 a limited distance due to cocking of the wobble bar 148 in the transverse bore 158 until it comes into contact with the shoulder 222 on piston 124. There is established, therefore, a direct drive through the actuator 152 to the piston 124 because the resistance to such movement offered by the piston in the failed subsystem falls below, say, 5 to 10 psig, e.g., the hydraulic line is broken or has a leak in it. Since there is no force which resists movement of the piston 126, all of the force applied through pitman 162 is now applied to piston 124 instead of being divided between pistons 124 and 126 as is the usual case with both subsystems operative.

It is this direct drive or take-over action, as opposed to the normal differential driving action which occurs when the two hydraulic subsystems are fully operative, that causes an apparent doubling of the force applied to the remaining subsystem. While to the operator there is no detectable increase in the pressure applied, nevertheless there is now no division of the force applied between two subsystems, and the entire force is applied to the one remaining subsystem.

As indicated above, the amount of "pedal dive" is extremely important for safety reasons. The gap between the shoulder 222 and the normal position of actuator 152 as illustrated in FIG. 4 controls the amount of "pedal dive." While this may be a relatively small distance within the body of the master hydraulic actuator such as shown in FIG. 4 because of the long lever arm on the brake pedal, this small distance is translated into an actual pedal movement distance of from a few hundreds of an inch if desired to as much as one inch. Some freedom of the hydraulic actuator 152 to move relative to the pistons 124 and 126 is desired since there is an equalizing effect insofar as pressure is concerned as determined by the resistance each of the pistons 124 and 126 meets in the course of movement within its respective hydraulic subsystem. The wobble bar 148 allows for this relative movement and accordingly divides the applied force from pitman bar 162 to the two pistons in an equalized fashion and in response to the resistance encountered by each piston in its respective subsystem.

In one test car embodiment the pistons 124 and 126 were each fabricated with a 13/16 inch diameter. The gap for take-over to direct drive between the shoulder 222 on piston 124 and actuator 152 (FIG. 4) is 3/32 inch. When a power assist is employed, the "pedal dive" is only 9/32 inch on failure of one subsystem. If the gap is reduced in this embodiment to less than 3/32 inch, the "pedal dive" is reduced and the volume of fluid available in the remaining cylinder is larger at the instant of take-over into direct drive, i.e., when actuator 152 seats itself on shoulder 222, for example.

What is claimed is:

1. In a dual hydraulic subsystem drum and shoe braking apparatus including a support member, a rotatable drum mounted for rotation relative to said support member, a pair of oppositely movable brake shoes carried by said support member and mounted for selective braking coaction between said support member and said drum, each of said shoes having a centrally located force receiving abutment, the improvement which comprises:

a. dual subsystem hydraulic actuator means mounted on said support and disposed between confronting ends of said brake shoes and including a pair of parallel axised piston/cylinder assemblies each including a cylinder and a pair of oppositely acting pistons defining a variable volume hydraulic fluid chamber between their respective inner faces, each such chamber being hydraulically connected to one of said subsystems, the axes of said piston/cylinder assemblies lying in a common plane perpendicular to the axis of the rotatable drum;

b. force-sensing and distributing means coacting between the outer faces of parallel acting pistons and each of said centrally located abutments, respectively, of the confronting brake shoes for receiving the off-center thrust of at least one pair of said oppositely acting pistons and transmitting said thrust to each said centrally located abutment, respectively, of said confronting brake shoes, said centrally located force receiving abutments each including a socket attached centrally of the confronting brake shoe, and the associated pistons are each being provided with sockets in their outer faces, said centrally located brake shoe sockets and the piston sockets being of circular cross section and of larger diameter at their openings than at their bases, and in which the force-sensing and distributing means comprises a bar, a pair of piston-engaging rod members extending from one side thereof for coaction with the sockets in the parallel acting pistons and a single oppositely extending brake shoe abutment-engaging rod member for coaction with the socket in the confronting brake shoes and lying on an axis parallel to the axes of the piston rod members and equidistant therefrom.

2. A dual hydraulic subsystem drum and shoe braking apparatus in accordance with claim 1 in which the depth of the piston sockets is greater than one-half the axial length of the pistons.

3. A dual hydraulic subsystem drum and shoe braking apparatus in accordance with claim 1 in which the rod members coacting with the pistons and the rod member coacting with the brake shoe abutment are provided with hemispherical bearing surfaces.

* * * * *